United States Patent
Veselinov et al.

(10) Patent No.: US 9,355,037 B2
(45) Date of Patent: May 31, 2016

(54) POPULATING ITEMS IN WORKLISTS USING EXISTING CACHE

(71) Applicants: Veselin Veselinov, Sofia (BG); Valeri Nikolov, Sofia (BG)

(72) Inventors: Veselin Veselinov, Sofia (BG); Valeri Nikolov, Sofia (BG)

(73) Assignee: SAP SE, Walldorf (DE)

( * ) Notice: Subject to any disclaimer, the term of this patent is extended or adjusted under 35 U.S.C. 154(b) by 96 days.

(21) Appl. No.: 14/472,793

(22) Filed: Aug. 29, 2014

(65) Prior Publication Data

US 2016/0062901 A1 Mar. 3, 2016

(51) Int. Cl.
*G06F 12/08* (2006.01)
*G06F 17/30* (2006.01)

(52) U.S. Cl.
CPC ...... *G06F 12/0888* (2013.01); *G06F 17/30353* (2013.01); *G06F 17/30902* (2013.01); *G06F 2212/1044* (2013.01); *G06F 2212/608* (2013.01)

(58) Field of Classification Search
CPC .............. G06F 12/0888; G06F 2212/1044; G06F 2212/608; G06F 17/30902; G06F 17/30353
See application file for complete search history.

(56) References Cited

U.S. PATENT DOCUMENTS

| | | | | |
|---|---|---|---|---|
| 2002/0087504 | A1* | 7/2002 | Thompson | G06F 17/3008 707/610 |
| 2005/0033626 | A1* | 2/2005 | Kruse | G06Q 10/06 705/7.13 |
| 2005/0050067 | A1* | 3/2005 | Sollicito | G06F 17/30902 707/620 |
| 2008/0167973 | A1* | 7/2008 | De Marcken | G06F 17/30902 705/5 |
| 2009/0307257 | A1* | 12/2009 | Menon | G06F 17/30539 707/713 |
| 2011/0055683 | A1* | 3/2011 | Jiang | G06F 17/30899 715/234 |
| 2013/0318191 | A1* | 11/2013 | Yin | H04L 67/2842 709/213 |
| 2015/0150092 | A1* | 5/2015 | Raizada | H04L 63/10 726/4 |

OTHER PUBLICATIONS

SAP Help cite entitled "Features of the UWL"; 3 pages; https://help.sap.com/saphelp nw7Oehp2/helpdata/en/90/f0c4e9a2b2435897660d44b0a19a76/content.htm>>; [Aug. 28, 2014 12:48:05 PM].

SAP Help cite entitled "Universal Worklist Configuration"; 2 pages; <<https://help.sap.com/saphelp nw70/helpdata/en/39/a1bb5c4c0d4ab4a417e87ef35f1efa/frameset.htm>>; [Aug. 28, 2014 12:48:30 PM].

SAP Help cite entitled "Using the Universal Worklist"; 2 pages; <<https://help.sap.com/...n/57/c223be82104792a15c2df11377b9ed/frameset.htm&current toc=/en/73/69f5c755bb11d189680000e829fbbd/plain.htm&node_id=251&show_children=false>>l [Aug. 28, 2014 12:47:13 PM].

* cited by examiner

*Primary Examiner* — Hiep Nguyen
(74) *Attorney, Agent, or Firm* — Fish & Richardson P.C.

(57) ABSTRACT

Methods, systems, and computer-readable storage media for providing a worklist of a user with at least one item. In some implementations, actions include determining one or more timestamps, each timestamp indicating a time, at which an item cache was synchronized for a respective provider of one or more providers, transmitting one or more requests to one or more respective providers of the one or more providers, the one or more requests each including the one or more timestamps and indicating a user, receiving one or more responses, each response including a sub-set of items, each item in the sub-set of items being included in the sub-set of items based on the one or more timestamps, populating the worklist of the user with one or more items in the sub-set of items reusing a previously synchronized worklist database cache, and providing the worklist for display to the user on a display.

20 Claims, 4 Drawing Sheets

POPULATING ITEMS IN WORKLISTS USING EXISTING CACHE

BACKGROUND

Integrated platforms can be associated with a plurality of applications and/or systems, also referred to as providers. Some integrated platforms provide a worklist that enables users to manage items across the plurality of providers. In some platforms, all items from all providers are periodically retrieved, and are stored in an item cache. Items are also retrieved from providers on each user log in. However, some or all of the items are already in the item cache. Consequently, periodic retrieval of all items from all providers results in superfluous requests for items, unnecessary utilization of the network traffic, and increased processors, e.g., CPU, utilization and memory utilization. This can result in performance degradation and system instability.

SUMMARY

Implementations of the present disclosure include computer-implemented methods for providing a worklist of a user with at least one item. In some implementations, actions include determining one or more timestamps, each timestamp indicating a time, at which an item cache was synchronized for a respective provider of one or more providers, transmitting one or more requests to one or more respective providers of the one or more providers, the one or more requests each including the one or more timestamps and indicating a user, receiving one or more responses, each response including a sub-set of items, each item in the sub-set of items being included in the sub-set of items based on the one or more timestamps, populating the worklist of the user with one or more items in the sub-set of items reusing a previously synchronized worklist database cache, and providing the worklist for display to the user on a display.

These and other implementations can each optionally include one or more of the following features: each item in the sub-set of items is associated with an update timestamp that is later than a timestamp of the one or more timestamps; at least one provider of the one or more providers includes a system that is associated with an integrated platform, the integrated platform providing the item cache; actions further include updating the item cache based on items included in the sub-set of items; updating the item cache includes storing new items to the item cache, deleting old versions of items from the item cache, and storing new versions of items in the item cache; each provider of the plurality of providers is associated with the user; and actions further include determining that the worklist is to be provided based on a particular mode, the particular mode indicating that the one or more requests are to include the one or more timestamps.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
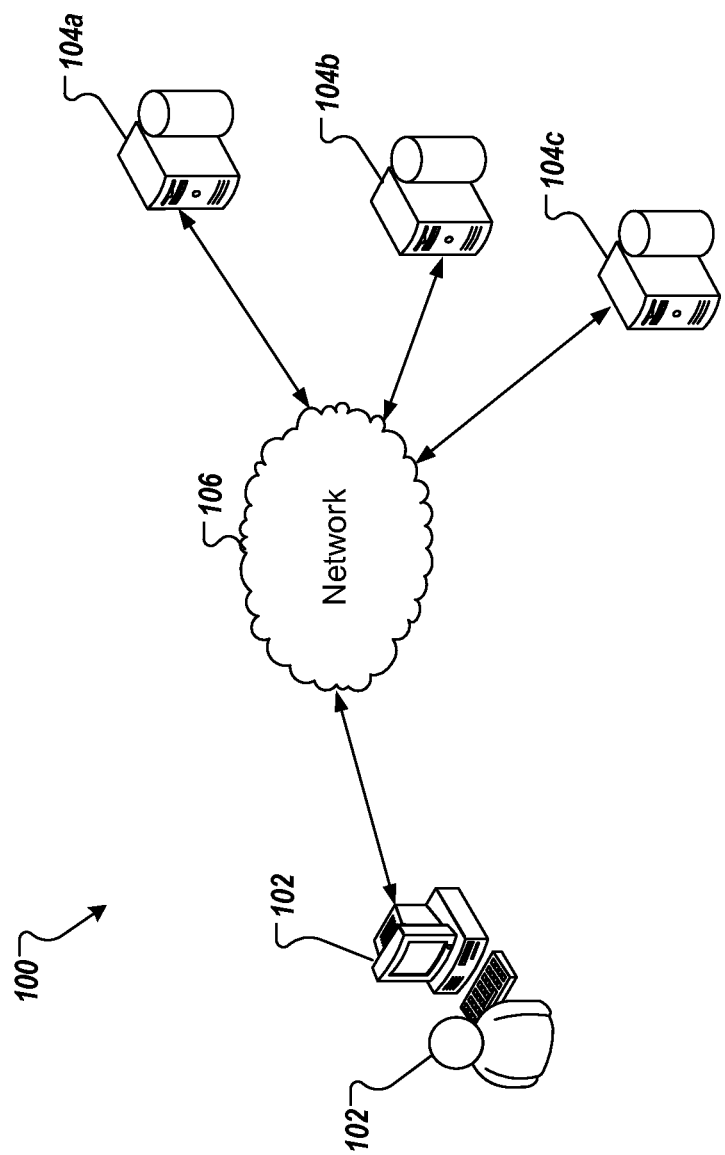
FIG. 1 depicts an example high-level architecture in accordance with implementations of the present disclosure.

Implementations of the present disclosure are generally directed to populating a worklist of items to include one or more items associated with a plurality of providers. More particularly, implementations of the present disclosure are directed to providing a set of items from each provider of the plurality of providers based on a timestamp, providing a subset of items including items in the sets of items, and populating a worklist associated with a user to include items in the subset of items. In some examples, the timestamp indicates a time, at which a cache was synchronized with the plurality of providers. In some examples, the cache stores items provided from the plurality of providers. In some implementations, a provider includes at least one item in a respective set of items, in response to determining that the at least one item has a change associated therewith, the change occurring after the time indicated by the timestamp. In some examples, items in the superset of items are merged with items in the cache.

Implementations of the present disclosure will be described in detail herein with reference to an example context. The example context includes an integrated technology platform (integrated platform). In some examples, the integrated platform includes a service-oriented architecture that provides a development and runtime environment for a plurality of systems and/or applications, each of which can also be referred to as a provider. Example systems and/or applications (providers) can include a workflow system, e.g., a business workflow system, a process management system, e.g., a business process management system, a process modeling system, a collaborative tasks system, and a notifications system. In some examples, the integrated platform provides functionality for custom development and integration across disparate providers. For example, the integrated platform can provide functionality for the composition, provisioning, and management of applications across a heterogeneous software environment. An example integrated platform includes SAP NetWeaver, which is provided by SAP SE of Walldorf, Germany.

In the example context, an integrated platform can provide a composite worklist (worklist) that enables centralized task management. In some examples, a worklist is specific to a particular user of the integrated platform and can be populated with items. In some examples, the user uses their respective worklist to manage, respond to, and/or delegate items. Example items can include notifications, alerts, mission-critical workflows, approvals, and ad hoc tasks that the user may be at least partially responsible for. In some examples, items can be automatically generated, e.g., by the applications and/or systems of the integrated platform, or can be generated by users. In some examples, the worklist provides a uniform layout and central access to items and required information, e.g., information required to attend to items, enables the user to customize worklist views, summarizes items from disparate providers, displays additional information from document and object repositories, if necessary, including attachments and other details, supports decision making and actions, and/or enables the user to define another user as a substitute for the user's tasks in the event of an absence, e.g., delegate tasks. An example worklist includes the Universal Worklist (UWL) provided by SAP SE of Walldorf, Germany.

FIG. 1 depicts an example architecture 100 in accordance with implementations of the present disclosure. The example architecture 100 can provide an integrated platform that uses worklists, such as the integrated platform and worklists described above. In the example of FIG. 1, the architecture 100 includes a computing 102, server systems 104a. 104b, 104c and a network 106. In the depicted example, a user 108 interacts with the user workstation 102. In an example context, the user 108 can include a user, who interacts with an integrated platform that is hosted by the server system 104a, and which integrates others systems and/or applications hosted by the server systems 104b, 104c.

In some examples, the computing device 102 can communicate with one or more of the server systems 104a, 104b, 104c over the network 106. In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server system 104a, 104b, 104c includes at least one server and at least one data store. In the example of FIG. 1, the server systems 104a, 104b, 104c are intended to represent various forms of servers including, but not limited to a web server, an application server, a proxy server, a network server, and/or a server pool. In general, server systems accept requests for application services and provides such services to any number of client devices, e.g., the computing device 102, over the network 106.

Figure 2:
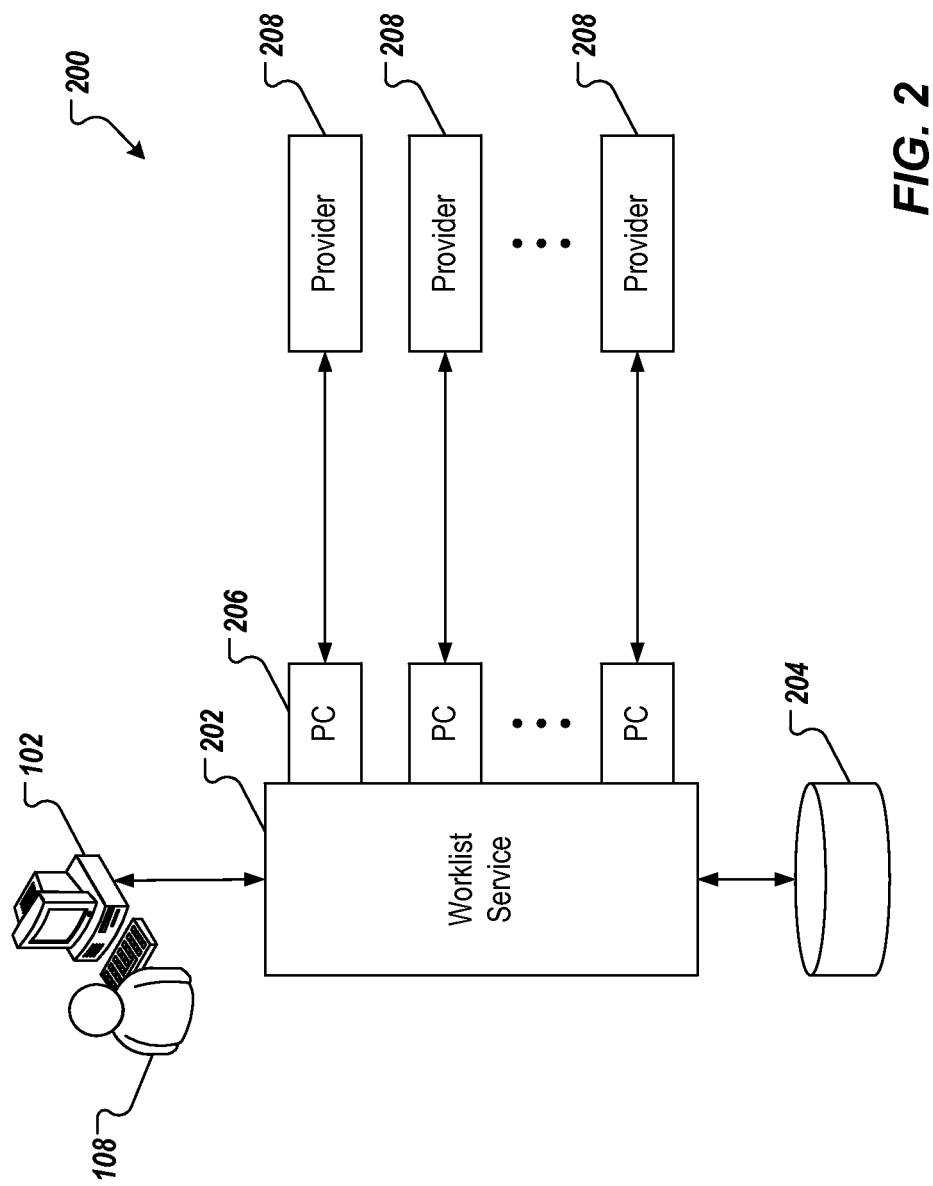
FIG. 2 depicts an example environment that can execute implementations of the present disclosure.

FIG. 2 depicts an example environment 200 that can execute implementations of the present disclosure. The example environment 200 includes a worklist service 202, an item cache 204, one or more provider connectors (PCs) 206, and one or more providers 208. In some examples, the worklist service 202 is provided as one or more computer-executable programs of an integrated platform, e.g., provided in the example architecture 100 of FIG. 1. In some examples, the user 108 interacts with the worklist platform 202 using the computing device 102, e.g., over the network 106. In some examples, the item cache 208 is provided in computer-readable memory. For example, the server system 104a of FIG. 1 can provide the worklist service 202, the provider connectors 206 and the item cache 204. In some examples, a provider connector 206 corresponds to a respective provider 208. Each provider connector 206 provides functionality for requesting and receiving items from a respective provider 208, e.g., over the network 106. For example, the server systems 104b, 104c can include one or more of the providers 208 of FIG. 2.

In some implementations, the item cache 204 is associated with a cache validity. In some examples, the cache validity indicates an expiration time, after which items in the cache is to be synchronized. For example, it can be provided that the item cache 204 is to be synchronized every X minutes, e.g., a synchronization period set by an administrator. In some examples, upon occurrence of the expiration time, the item cache 204 is synchronized. In some examples, synchronization includes requesting items from providers, and storing items received from providers in the item cache 204. In some examples, items are requested for all users and from all providers. In some examples, items are requested for a particular user and only from providers associated with the particular user. In some examples, a timestamp is provided that indicates when a successful synchronization occurs. In some examples, a successful synchronization includes the receipt and storage of all requested items. In some examples, synchronization can be unsuccessful, e.g., can time out, before items are received and stored. In some examples, the expiration time is provided based on the timestamp and the synchronization period. For example, it can be determined that the expiration time has elapsed X minutes after the most recent timestamp.

In accordance with implementations of the present disclosure, the worklist of a user is populated with one or more items. In some examples, the worklist is populated with items in response to an event. An example event can include the user logging into the integrated platform. For example, the user can provide credentials, e.g., username, password, and can be authenticated by the integrated platform based on the credentials. In response to authentication of the user, a worklist service, e.g., the worklist service 202 of FIG. 2, can automatically, e.g., without requiring user input, request and receive items from one or more providers, e.g., the providers 208 of FIG. 2. Another example event includes tolling of an expiration time, e.g., as described above with reference to FIG. 2. In response to tolling of the expiration time, the worklist service can automatically request and receive items from one or more providers.

In some implementations, the worklist service includes an index of providers associated with the particular user, e.g., the user 108 of FIGS. 1 and 2. In some examples, each provider in the index of providers for the user is a provider that the user is to receive items from. In some examples, for each provider in the index of providers, a request is sent from a provider connector to the respective provider. In some implementations, the request includes user credentials, e.g., username, password, and a synchronization timestamp. In some examples, the user credentials are the same credentials used by the user to log into the integrated platform, e.g., the worklist service. In some examples, the credentials are specific to the particular provider, to which the request is being sent, e.g., credentials used to log into the particular provider.

In some examples, the synchronization timestamp indicates a time, e.g., date and time, at which the item cache was last successfully synchronized, e.g., for the particular user, for all users.

In some implementations, each provider includes a respective user-item index, which maps particular users to one or more items that are to be provided to the user from the respective provider. In some examples, an update timestamp is provided for each item, the update timestamp indicating a time, at which the respective item was last updated. In some examples, updating of an item can include one or more of creating the item and modifying the item. In response to receiving the request, each provider cross-references the user-item index based on the user, e.g., the using user credentials provided in the request, to provide a set of items that can be provided to the worklist service. In some implementations, and for each item in the set of items, the respective update timestamp is compared to the synchronization timestamp provided in the request. If the update timestamp is later than the synchronization timestamp, the respective item is included in a sub-set of items. If the update timestamp is earlier than the synchronization timestamp, the respective item is not included in a sub-set of items. In some examples, if the update timestamp is equal to the synchronization timestamp, the respective item is included in a sub-set of items. Each provider transmits a response to the request, the response including the sub-set of items.

In some implementations, the worklist service receives responses from one or more of the providers, the responses including respective sub-sets of items. In some examples, a superset of items can be provided, which includes items of the sub-sets of items. In some implementations, items in the sub-sets of items (or the super-set of items), are merged with items in the item cache. For example, items in the sub-sets of items (or the super-set of items) can be compared to items already stored in the item cache for the particular user. In some examples, if an earlier version of an item is already included in the item cache, the earlier version of the item is deleted and the item is stored in the item cache. In some examples, if an item is not already stored in the item cache, the item is stored in the item cache.

In some implementations, the worklist service populates a worklist based on items stored in the item cache, and provides the worklist for display. For example, the worklist can be initially provided as a worklist template. The worklist template can be provided as a computer-readable/-writable document. In some examples, data of items associated with a particular user is retrieved from the item cache, and the worklist template is populated with the data to provide a populated worklist. The populated worklist can be transmitted from the worklist service to the computing device, which can display the worklist to the user.

Figure 3:
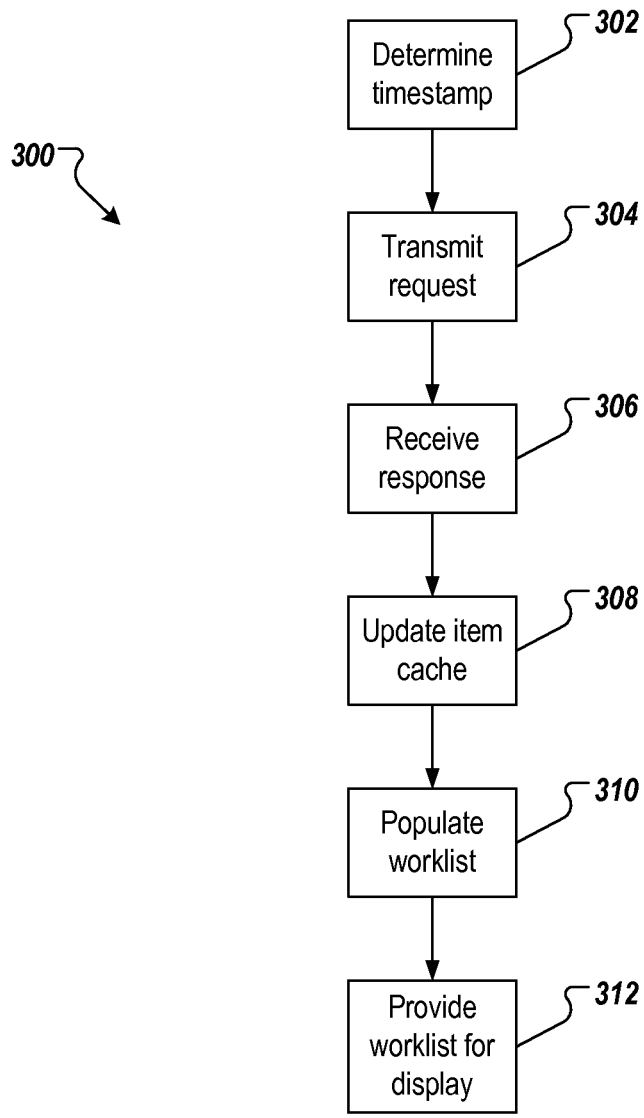
FIG. 3 depicts an example process that can be executed in accordance with implementations of the present disclosure.

FIG. 3 depicts an example process 300 that can be executed in accordance with implementations of the present disclosure. In some examples, the example process 300 can be provided as one or more computer-executable programs executed using one or more computing devices.

A timestamp is determined (302). For example, a worklist service can determine a timestamp that indicates a time, e.g., date and time, at which the item cache was last successfully synchronized, e.g., a synchronization timestamp. In some examples, the timestamp is read from computer-readable memory. One or more requests are transmitted (304). For example, the worklist service determines one or more service providers associated with a user, e.g., based on an index of providers associated with the particular user. In some examples, a request is transmitted to each provider of the one or more providers, and includes the timestamp and data indicating the user, e.g., user credentials. One or more responses are received (306). In some examples, each provider that receives a request determines a sub-set of items based on the timestamp, as described herein, and provides a response to the worklist service that includes the respective sub-set of items.

The item cache is updated (308). For example, the worklist service compares items in the sub-set(s) of items to items in the item cache for the particular user, and stored new items in the item cache, deletes old versions of items in the item cache, and stores new versions of the deleted items in the item cache. A worklist is populated (310). For example, and for a particular user, the worklist service populates the worklist, e.g., beginning with a worklist template, with data of items associated with the particular user. The worklist is provided for display (312). For example, the worklist service transmits the worklist to a computing device, which displays the worklist to the particular user.

Implementations of the present disclosure improve the overall operational efficiency of an integrated platform by reducing resources and bandwidth required to retrieve items that are to be stored in an item cache, and that are to be used to populate a worklist provided to a user. More particularly, implementations of the present disclosure only retrieve items that have changed since they were last synchronized with the item cache. In this manner, superfluous requests for items is reduced, unnecessary utilization of the network traffic is avoided, and decreased processors, e.g., CPU, utilization and memory utilization is provided. This results in avoiding performance degradation and system instability of the integrated platform.

In some implementations, whether to populate a worklist in accordance with implementations of the present disclosure can be a selectable option. For example, in a first mode, a user's worklist can be populated by resynchronizing all items regardless of timestamp. That is, for example, in the first mode, a request can be transmitted to each provider of the one or more providers, and includes data indicating the user, e.g., user credentials. Each provider that receives a request determines all items associated with the user based on the data, and provides a response to the worklist service that includes all of the items. In a second mode, however, a request can be transmitted as described above, where the request includes the timestamp and data indicating the user, e.g., user credentials and respective responses are provided to the worklist service that includes respective sub-sets of items (as opposed to all items).

In some implementations, a user interface can be provided that enables one of the first mode and the second mode to be selected. For example, an administrator can determine whether the system is to operate using the first mode or the second mode. In some examples, the mode selection is applied to all users having worklists. In some example, finer-grained control can be provided, where the mode can be selected on a user-by-user basis. For example, for a first user, the first mode can be selected, and for a second user the second mode can be selected.

Figure 4:
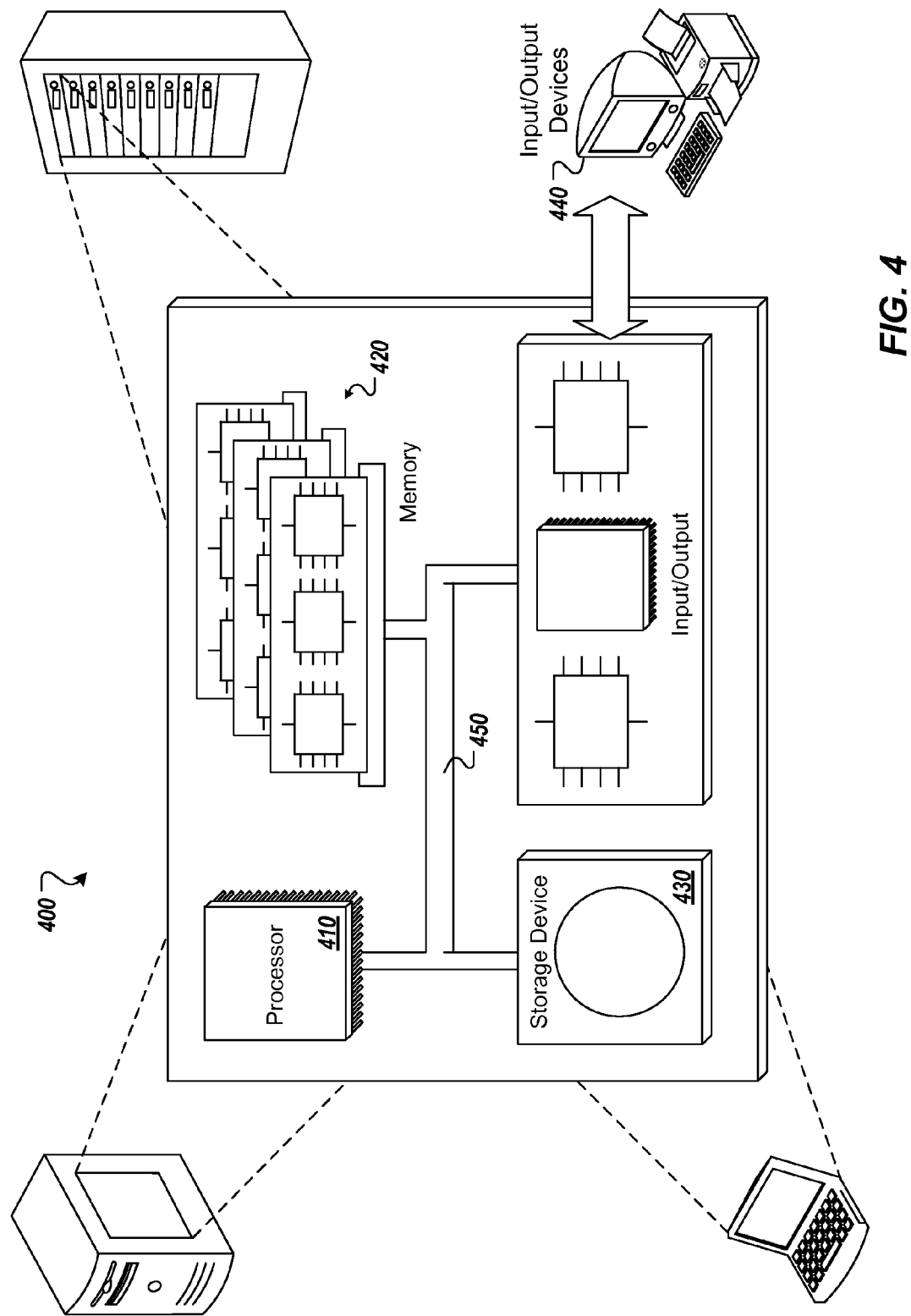
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450.

The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 800. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing a worklist of a user with at least one item, the method being executed using one or more processors and comprising:
   determining, by the one or more processors, one or more timestamps, each timestamp indicating a time, at which an item cache was synchronized for a respective provider of one or more providers; transmitting, by the one or more processors, one or more requests to one or more respective providers of the one or more providers, the one or more requests each comprising the one or more timestamps and indicating a user;
   receiving, by the one or more processors, one or more responses, each response comprising a sub-set of items, each item in the sub-set of items being included in the sub-set of items based on the one or more timestamps;
   populating, by the one or more processors, the worklist of the user with one or more items in the sub-set of items reusing a previously synchronized worklist database cache; and
   providing, by the one or more processors, the worklist for display to the user on a display.

2. The method of claim 1, wherein each item in the sub-set of items is associated with an update timestamp that is later than a timestamp of the one or more timestamps.

3. The method of claim 1, wherein at least one provider of the one or more providers comprises a system that is associated with an integrated platform, the integrated platform providing the item cache.

4. The method of claim 1, further comprising updating the item cache based on items included in the sub-set of items.

5. The method of claim 4, wherein updating the item cache comprises storing new items to the item cache, deleting old versions of items from the item cache, and storing new versions of items in the item cache.

6. The method of claim 1, wherein each provider of the plurality of providers is associated with the user.

7. The method of claim 1, further comprising determining that the worklist is to be provided based on a particular mode, the particular mode indicating that the one or more requests are to include the one or more timestamps.

8. A non-transitory computer-readable storage medium coupled to one or more processors and having instructions stored thereon which, when executed by the one or more processors, cause the one or more processors to perform operations for providing a worklist of a user with at least one item, the operations comprising:
 determining one or more timestamps, each timestamp indicating a time, at which an item cache was synchronized for a respective provider of one or more providers;
 transmitting one or more requests to one or more respective providers of the one or more providers, the one or more requests each comprising the one or more timestamps and indicating a user;
 receiving one or more responses, each response comprising a sub-set of items, each item in the sub-set of items being included in the sub-set of items based on the one or more timestamps;
 populating the worklist of the user with one or more items in the sub-set of items reusing a previously synchronized worklist database cache; and
 providing the worklist for display to the user on a display.

9. The computer-readable storage medium of claim 8, wherein each item in the sub-set of items is associated with an update timestamp that is later than a timestamp of the one or more timestamps.

10. The computer-readable storage medium of claim 8, wherein at least one provider of the one or more providers comprises a system that is associated with an integrated platform, the integrated platform providing the item cache.

11. The computer-readable storage medium of claim 8, wherein operations further comprise updating the item cache based on items included in the sub-set of items.

12. The computer-readable storage medium of claim 11, wherein updating the item cache comprises storing new items to the item cache, deleting old versions of items from the item cache, and storing new versions of items in the item cache.

13. The computer-readable storage medium of claim 8, wherein each provider of the plurality of providers is associated with the user.

14. The computer-readable storage medium of claim 8, wherein operations further comprise determining that the worklist is to be provided based on a particular mode, the particular mode indicating that the one or more requests are to include the one or more timestamps.

15. A system, comprising:
 a computing device; and
 a computer-readable storage device coupled to the computing device and having instructions stored thereon which, when executed by the computing device, cause the computing device to perform operations for providing a worklist of a user with at least one item, the operations comprising:
  determining one or more timestamps, each timestamp indicating a time, at which an item cache was synchronized for a respective provider of one or more providers;
  transmitting one or more requests to one or more respective providers of the one or more providers, the one or more requests each comprising the one or more timestamps and indicating a user;
  receiving one or more responses, each response comprising a sub-set of items, each item in the sub-set of items being included in the sub-set of items based on the one or more timestamps;
  populating the worklist of the user with one or more items in the sub-set of items reusing a previously synchronized worklist database cache; and
  providing the worklist for display to the user on a display.

16. The system of claim 15, wherein each item in the sub-set of items is associated with an update timestamp that is later than a timestamp of the one or more timestamps.

17. The system of claim 15, wherein at least one provider of the one or more providers comprises a system that is associated with an integrated platform, the integrated platform providing the item cache.

18. The system of claim 15, wherein operations further comprise updating the item cache based on items included in the sub-set of items.

19. The system of claim 18, wherein updating the item cache comprises storing new items to the item cache, deleting old versions of items from the item cache, and storing new versions of items in the item cache.

20. The system of claim 15, wherein each provider of the plurality of providers is associated with the user.

* * * * *